(12) United States Patent
Kim

(10) Patent No.: US 10,300,797 B2
(45) Date of Patent: *May 28, 2019

(54) SYSTEM AND METHOD FOR CONTROLLING START OF FUEL CELL VEHICLE

(71) Applicant: Hyundai Motor Company, Seoul (KR)

(72) Inventor: Dae Jong Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 239 days.

This patent is subject to a terminal disclaimer.

(21) Appl. No.: 15/295,199

(22) Filed: Oct. 17, 2016

(65) Prior Publication Data

US 2017/0305286 A1 Oct. 26, 2017

(30) Foreign Application Priority Data

Apr. 26, 2016 (KR) ........................ 10-2016-0051164

(51) Int. Cl.
*H02J 7/00* (2006.01)
*H02J 7/14* (2006.01)
*B60L 11/18* (2006.01)
*B60L 58/31* (2019.01)
*B60L 58/40* (2019.01)

(52) U.S. Cl.
CPC .......... *B60L 11/1812* (2013.01); *B60L 58/31* (2019.02); *B60L 58/40* (2019.02); *B60L 2240/547* (2013.01); *B60L 2240/549* (2013.01); *B60L 2240/80* (2013.01); *Y02T 90/34* (2013.01)

(58) Field of Classification Search
USPC ................ 320/101, 107, 108, 109, 134, 137
See application file for complete search history.

(56) References Cited

U.S. PATENT DOCUMENTS

2009/0230917 A1\* 9/2009 Kojima ............... B60L 11/1851
320/101
2012/0083940 A1\* 4/2012 Mori ................... B60L 11/1881
700/298

(Continued)

FOREIGN PATENT DOCUMENTS

JP 2007-57399 3/2007
JP 2007-165055 A 6/2007

(Continued)

*Primary Examiner* — Alexis B Pacheco
(74) *Attorney, Agent, or Firm* — Mintz Levin Cohn Ferris Glovsky and Popeo, P.C.; Peter F. Corless

(57) ABSTRACT

A system and method for controlling a start of a fuel cell vehicle are provided. The method includes providing hydrogen and air to a fuel cell and operating a converter to maintain a voltage of a high voltage bus constant. The converter is disposed between a high-voltage battery and the high voltage bus to which an output stage of the fuel cell is connected, and the voltage of the high voltage bus becomes a preset lowest control voltage. A charge current of the high-voltage battery is set as a charge limit current and an air supply amount is adjusted and the converter is operated to provide a current corresponding to an amplitude of the charge limit current to the high-voltage battery. The charge limit current is changed based on comparing a sensed charge current, obtained by sensing a current input to the high-voltage battery, with the charge limit current.

16 Claims, 2 Drawing Sheets

(56) References Cited

U.S. PATENT DOCUMENTS

| | | | | |
|---|---|---|---|---|
| 2014/0186732 | A1* | 7/2014 | Tachibana | B60K 11/06 |
| | | | | 429/429 |
| 2016/0133965 | A1* | 5/2016 | Imanishi | H01M 8/04089 |
| | | | | 429/9 |
| 2016/0190617 | A1* | 6/2016 | Haase | B60L 1/003 |
| | | | | 429/439 |
| 2017/0203665 | A1* | 7/2017 | Lee | B60L 11/1861 |
| 2018/0215273 | A1* | 8/2018 | Tanaka | B60L 11/1814 |

FOREIGN PATENT DOCUMENTS

| | | |
|---|---|---|
| JP | 2007-184202 | 7/2007 |
| JP | 2009-159689 A | 7/2009 |
| JP | 2009-225522 A | 10/2009 |
| JP | 2011-250656 A | 12/2011 |
| JP | 2015-021861 A | 2/2015 |
| JP | 2015-224975 A | 12/2015 |
| KR | 10-2008-0037223 A | 4/2008 |
| KR | 10-2010-0035182 A | 4/2010 |
| KR | 10-2012-0061663 A | 6/2012 |
| KR | 10-1351349 B1 | 1/2014 |
| KR | 10-2014-0051908 | 5/2014 |
| KR | 10-2014-0078948 A | 6/2014 |
| KR | 10-2014-0121365 | 10/2014 |
| KR | 10-2015-0043613 A | 4/2015 |
| KR | 10-2015-0051271 A | 5/2015 |
| KR | 10-2015-0071821 A | 6/2015 |
| KR | 10-2015-0078448 | 7/2015 |
| KR | 10-2016-0035743 A | 4/2016 |

\* cited by examiner

SYSTEM AND METHOD FOR CONTROLLING START OF FUEL CELL VEHICLE

CROSS REFERENCE TO RELATED APPLICATION

The present application claims priority to Korean Patent Application No. 10-2016-0051164 filed Apr. 26, 2016, the entire contents of which is incorporated herein for all purposes by this reference.

BACKGROUND

1. Field of the Invention

The present invention relates to a system and method for controlling a start of a fuel cell vehicle, and more particularly, to a method for controlling a start of a fuel cell vehicle that ensures rapid startability by adjusting the amplitude of current output from a fuel cell to be at an allowable level while constant-voltage controlling the fuel cell upon the cold start of the fuel cell.

2. Description of the Related Art

Generally, driving of a fuel cell with a low voltage and a high current during a cold start is advantageous in that a fuel cell is heated. In other words, when the voltage of a fuel cell is adjusted to be a lowest voltage allowed by a system in an identical output condition, the fuel cell may be heated rapidly while outputting the highest current. A fuel cell, a converter configured to convert the voltage of a high-voltage battery, and an inverter configured to drive a motor in an actual fuel cell vehicle system are connected to each other at a high voltage bus, and the converter is constant-voltage-adjusted to a lowest allowable value during a cold start to maintain the voltage of the fuel cell low and to induce rapid heating.

In particular, in such a process, when a high-voltage battery is charged to supply current, the current output of the fuel cell may be increased to enable more rapid heating. Typically, the high-voltage battery is managed to be charged and discharged within the charge and discharge output limitation by operating a fuel cell and the converter with reference to charge output limitation (kW) and discharge output limitation (kW) information, generated by a battery management system (BMS).

As described above, since charging a battery with as much energy as possible during constant-voltage operation is a method that uses a substantial amount of output of the fuel cell, it is advantageous from the aspect of heating. However, charging may not be performed to the charge output limitation, or overcharging may occur, due to a current sensing error that occurs in a sensor configured to detect the angle between a charge current provided from a converter, which converts the output of the fuel cell to provide the converted output to the high-voltage battery, and a high-voltage battery current detected by the BMS in the high-voltage battery. Accordingly, even when there is sufficient energy to increase the charge current within a current limitation range, it is typically unfavorable to secure a heating amount for low-temperature heating of a fuel cell, or the durability of the high-voltage battery may be degraded due to overcurrent because a charge current is set low.

The matters described as the background arts are merely intended to increase the understanding of the background of the present invention, and should not be recognized as being prior arts which are already known to those skilled in the art.

SUMMARY

Accordingly, the present invention provides a system and method for controlling the start of a fuel cell vehicle capable of ensuring rapid startability by controlling the amplitude of a current output from a fuel cell to be as large as possible at an allowable level, while constant-voltage-controlling a fuel cell at the time of cold start of the fuel cell.

Accordingly, the present invention provides a method for controlling the start of a fuel cell vehicle that may include: providing, by a controller, hydrogen and air to a fuel cell; operating, by the controller, a converter to maintain a voltage of a high voltage bus constant, wherein the converter may be disposed between a high-voltage battery and the high voltage bus to which an output stage of the fuel cell may be connected, and the voltage of the high voltage bus may be adjusted to be a preset lowest control voltage; setting, by the controller, a charge current of the high-voltage battery as a charge limit current; adjusting, by the controller, an air supply amount to the fuel cell and operating the converter to provide a current that corresponds to an amplitude of the charge limit current to the high-voltage battery; and changing, by the controller, the charge limit current based on a result of comparing a sensed charge current, which is obtained by sensing a current input to the high-voltage battery, with the charge limit current.

The setting of the charge current may be performed to set the charge limit current by dividing the chargeable output of the high-voltage battery by the voltage of the high-voltage battery. The method may further include, after the changing the charge limit current, adjusting, by the controller, the air supply amount to the fuel cell and operating the converter to provide the charge limit current changed to the high-voltage battery. The changing of the charge limit current may be performed to add or subtract an error current, existing between the sensed charge current and the charge limit current, to or from the charge limit current to change or adjust the charge limit current.

The changing of the charge limit current may be performed to add or subtract an average error current, obtained by detecting and accumulating the error current between the sensed charge current and the charge limit current for respective preset time intervals and by dividing the accumulated error current by the total number of times of detection, to or from the charge limit current to change the charge limit current. The changing of the charge limit current may include: comparing the amplitudes of the sensed charge current and the charge limit current; accumulating a value, obtained by subtracting the charge limit current from the sensed charge current, for a preset number of first reference times, when the sensed charge current is greater than the charge limit current; deriving an average value by dividing the accumulated value of the subtraction by the number of first reference times; and updating the charge limit current with the value obtained by subtracting the average value from the charge limit current.

The changing of the charge limit current may further include: comparing a converter sensing current, sensed by the converter, with the charge limit current, when the sensed charge current is less than the charge limit current; comparing the sensed charge current with the charge limit current to determine whether the high-voltage battery is undercharged, when the difference between the converter sensing current and the charge limit current is within a preset range;

accumulating a value, obtained by subtracting the charge limit current from the sensed charge current, for a preset number of second reference times, when the high-voltage battery is determined to be undercharged; deriving an average value by dividing the accumulated subtracted value by the number of second reference times; and updating the charge limit current with the value obtained by subtracting the average value from the charge limit current. The number of first reference times may be less than the number of second reference times.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Figure 1:
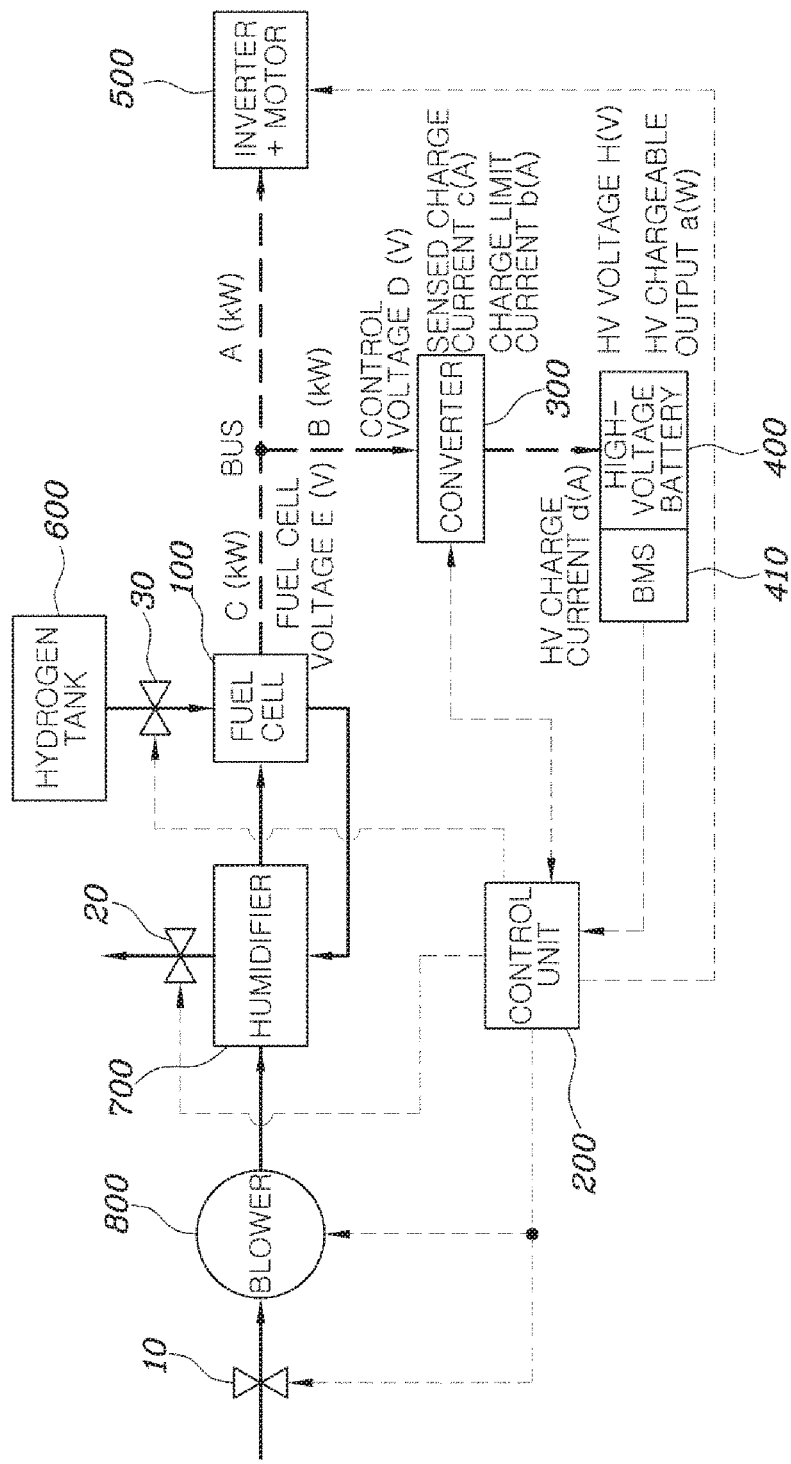
FIG. 1 is a block configuration diagram illustrating a fuel cell vehicle system to which a method for controlling a start of a fuel cell vehicle according to an exemplary embodiment of the present invention is applied.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, a method for controlling a start of a fuel cell vehicle according to various embodiments of the present invention will be described in detail with reference to the accompanying drawings. Reference now should be made to the drawings, in which the same reference numerals are used throughout the different drawings to designate the same or similar components.

FIG. 1 is a block configuration diagram illustrating a fuel cell vehicle system to which a method for controlling a start of a fuel cell vehicle according to an exemplary embodiment of the present invention is applied. Referring to FIG. 1, a fuel cell vehicle system, to which a method for controlling a start of a fuel cell vehicle according to an exemplary embodiment of the present invention is applied, may include a fuel cell system having a fuel cell 100 and various elements for providing fuel and air to the fuel cell 100, a converter 300 for forming an electrical connection with the fuel cell 100 at a high voltage bus, a high-voltage battery 400 configured to transmit and receive power with the high voltage bus using the converter 100, an inverter 500 connected to the high voltage bus to receive direct current (DC) power, convert the DC power to alternating current (AC) power, and provide the AC power to a motor, and a controller 200 configured to operate the fuel cell system, the converter 300, and the inverter 500.

In FIG. 1, as examples of the elements included in the fuel cell system, there may be an air supply valve 10, a blower 800 configured to compress the air supplied through the air supply valve 10 to generate high-pressure air, a humidifier 700 configured to provide moisture to the high-pressure air, an air discharge valve 20 for externally discharging air which has been discharged after reaction in the fuel cell 100, a hydrogen tank 600 configured to store hydrogen, which is the fuel of the fuel cell 100, and a hydrogen supply valve 30 configured to adjust the supply of hydrogen from the hydrogen tank 600 to the fuel cell 100, or the like.

According to the fuel cell vehicle system as described above, the inverter 500 may be configured to receive power from the high voltage bus and provide the power to the motor to consume the output of the motor through self-heating during the cold start. The power consumed by the motor is referred to as 'A'. At this point, outputs 'C' and 'B' may be respectively provided to the high voltage bus through the fuel cell 100 and the converter 300, namely, A=B+C. From the aspect of heating the fuel cell, when the high-voltage battery 400 is driven (e.g., where B is a negative number) in a charge direction as much as possible, C may be maximized, which is very advantageous in heating the fuel cell 100. In addition, when the fuel cell 100 is driven such that the voltage E is a lowest in the range allowed by the system, the driving point thereof is the point at which the heating performance per hour is maximized.

In an exemplary embodiment of the present invention, while the fuel cell 100 is constant-voltage-driven with the voltage E being a low voltage, a charge current capable of charging the high-voltage battery 400 may be adjusted to be at the maximum value in the range allowed by the system. Accordingly, power consumption by the fuel cell 100 may be maximized and startability of the fuel cell vehicle may be rapidly secured during cold start.

Figure 2:
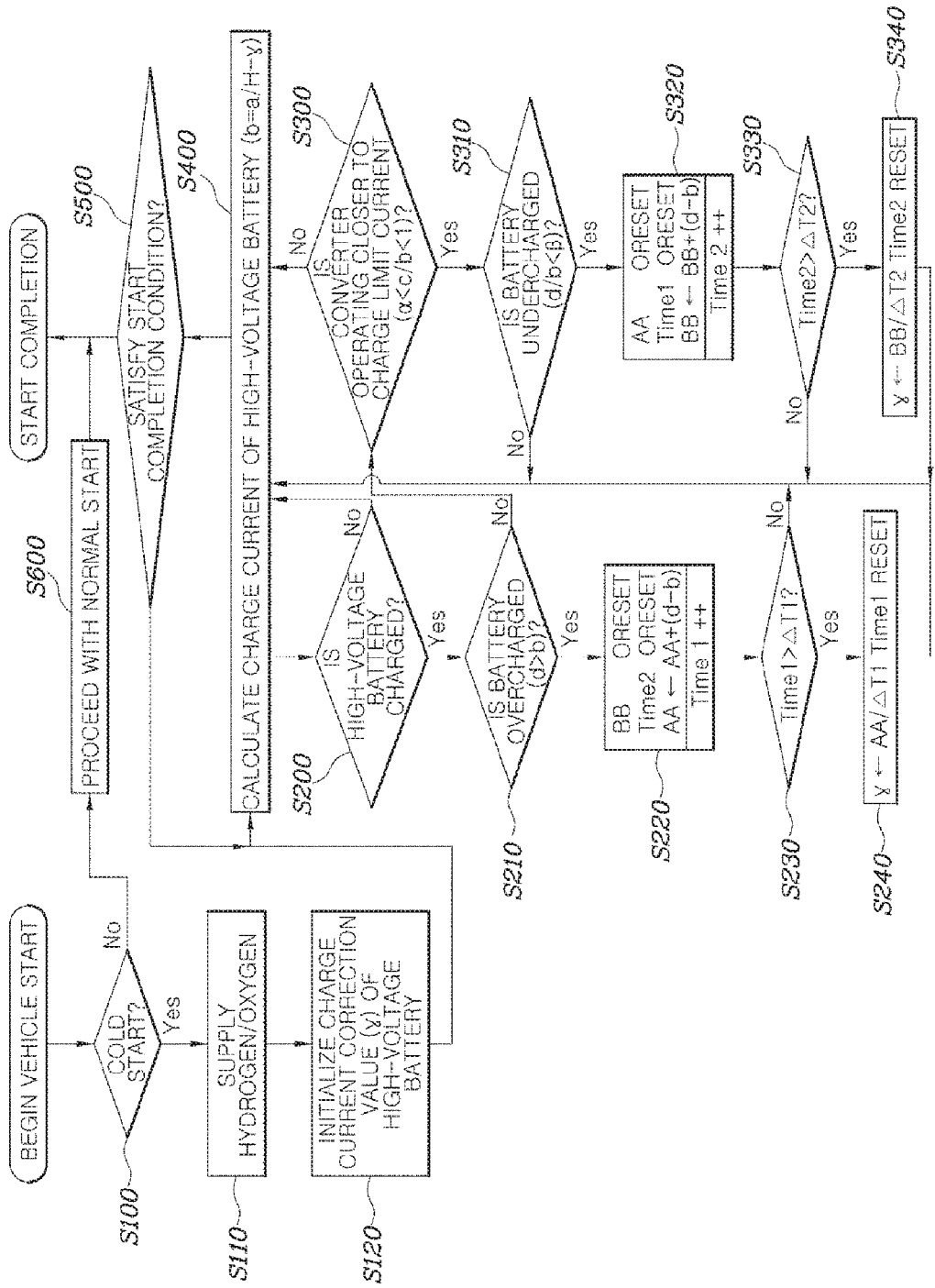
FIG. 2 is a flowchart illustrating a method for controlling a start of a fuel cell vehicle according to an exemplary embodiment of the present invention.

FIG. 2 is a flowchart illustrating a method for controlling the start of a fuel cell vehicle according to an exemplary embodiment of the present invention. Referring to FIG. 2, a method for controlling a fuel cell vehicle according to an exemplary embodiment of the present invention may include: supplying S110 hydrogen and air to the fuel cell 100 to perform constant-voltage-control such that the voltage at a high voltage bus of the converter 300, provided between the high voltage bus, to which an output stage of the fuel cell 100 is connected, and the high-voltage battery 400, becomes a preset lowest control voltage, setting S120 and S400 a charge current of the high-voltage battery 400 to a charge limit current b in a battery management system 410 of the high-voltage battery 400, adjusting S400, by the controller 200, an air supply amount and the converter 300 to provide a current that corresponds to the amplitude of the charge limit current b to the high-voltage battery 400, and changing S200 to S240, S300 to S340, and S400 the charge limit current based on the result of comparing a sensed charge current d, which is input to the high-voltage battery 400 and sensed by the battery management system 410, with the charge limit current b.

When the fuel cell 100 begins to be started, the controller 200 may be configured to determine whether the start is a cold start based on information such as the temperature of the fuel cell 100 (step S100). The temperature may be detected by receiving, by the controller 200, a value measured by a temperature sensor of the fuel cell 100. In step S100, in response to determining that the start is not a cold start, the controller 200 may perform a normal start process (step S600) and complete the process of starting the fuel cell vehicle.

When the controller 200 determines that the start is a cold start, the controller 200 may begin to perform control for supplying the hydrogen and air to the fuel cell 100 (step S110). For example, the controller 200 may be configured to open and adjust a hydrogen supply valve 30 and an air supply valve 10 to supply the hydrogen and air to the fuel cell 100. In particular, at step S110, the controller 200 may be configured to open and adjust the hydrogen valve 30 at a side of the hydrogen tank 600 and the air supply valve 10, and may be configured to operate the converter 300, disposed between the high voltage bus and the high-voltage battery 400, and the air supply valve 10 to determine the air supply amount to adjust the high voltage bus, to which the output stage of the fuel cell 100 is connected, to be constant-voltage controlled with a minimum voltage. During cold start, a technique for constant-voltage adjustment, by the controller 200, the voltage of the high voltage bus with the minimum voltage may be found in Korean Patent Application Number 10-2016-0042572, which was filed by the same applicant as the present application, incorporated herein by reference.

Further, the battery management system 410 of the high-voltage battery 400 may be configured to set the charge current of the high-voltage battery 400 to the charge limit current b (step S120 and S400). The battery management system 410 may further be configured to set the charge limit current b by dividing the chargeable output a (W) of the high-voltage battery 400 by the voltage H (V) of the high-voltage battery 400. In particular, in various exemplary embodiments of the present invention, the charge limit current b may be variably adjusted based on the result of comparing the charge limit current b and the sensed charge current d, and at this point, a correction value γ for correcting the charge limit current b may be applied to a previous charge limit current.

In the process for setting the charge limit current at the initial start, the battery management system (BMS) 410 may be configured to initialize the correction value to 0 (step 120) and set the charge limit current of the high-voltage battery 200 to a value obtained by dividing the chargeable output a of the high-voltage battery 400 by the voltage H of the high-voltage battery 400. In other words, the initial charge limit current b of the initial start may be determined as 'b=a/H' (step S400). Then, the controller 200 may be configured to adjust the amount of air supplied to the fuel cell 100 and the converter 300 to provide, to the high-voltage battery, current that corresponds to the amplitude of the set charge limit current b (step S400).

In particular, the controller 300 may first be configured to determine whether the high-voltage battery 400 is in charge (step S200), and when the high-voltage battery 400 is not in charge, the controller may be configured to perform constant-voltage-operation while increasing air flow to induce charging of the battery (see Korean Patent Application Number 10-2016-0042572) (step S400). Since step S400 in FIG. 2 may be understood as a step for setting and updating the charge limit current and accordingly adjusting the air supply amount and the converter to charge the high-voltage battery 400, when the high-voltage battery 400 is not being charged in step S200, the process may proceed to step S400.

In other words, it may be understood that in FIG. 2, a step for setting, by the battery management system 410 of the high-voltage battery 400, the charge current of the high-voltage battery 400 to the charge limit current b and a step for adjusting, by the controller 200, the air supply amount and operating the converter 300 to provide a current that corresponds to the amplitude of the charge limit current to the high-voltage battery may all be performed in the step indicated as 'S400'. In addition, when the battery is determined to be being charged, corresponding control may be performed based on whether the high-voltage battery 400 is overcharged or undercharged.

When the High-Voltage Battery 400 is Overcharged

To determine whether the high-voltage battery 400 is overcharged, the battery management system 410 may be configured to compare the amplitude of a preset charge limit current b with that of the sensed charge current d, which is the sensed current input to the high-voltage battery 400 (step S210). The battery management system 410 may include various sensors configured to constantly monitor the state of the high-voltage battery 400, and the current, voltage, and state of charge (SOC) of the high-voltage battery 400 may be monitored by the sensors. Accordingly, the current of the high-voltage battery 400, monitored by the battery management system 410, may become the sensed charge current d. In step S210, when the sensed charge current d is greater than the charge limit current b, the battery management system 410 may be configured to determine that the high-voltage battery 400 is overcharged and accumulate the value of (d-b), obtained by subtracting the charge limit current b from the sensed charge current d (step S220). In particular, the value of (d-b) is a positive number.

In step S220, the battery management system 410 may be configured to count the number of times Time1 that the value of (d-b) is accumulated. The process for determining the magnitude of the value (d-b) and accumulating the same may be performed for each preset time interval, and the number of times Time1 that the process is performed may be counted. In subsequent steps, when the counted number of times is equal to or greater than a preset reference number of times ΔT1, the accumulated value of (d-b) may be averaged. In other words, in step S230, the controller 200 may perform step S220 and may be configured to determine whether the number of times Time1 of performing the accumulation of (d-b) is equal to or greater than a preset reference number of times.

Further, as the result of the determination at step S230, when the number of times Time1 that the accumulation of (d-b) is performed is equal to or greater than the preset reference number of times, the controller 200 may be configured to calculate the correction value γ by dividing the accumulated value of (d-b) by a total count value (Step 240). Since the correction value may be obtained by accumulating the value of (d-b), which is a positive number, the correction value γ is also a positive number.

In step S400, the charge limit current b may be updated by subtracting the correction value γ from the preset charge limit current b. In other words, when the high-voltage battery 200 is in an overcharged state, at step S400, the battery management system 410 may be configured to calculate a new charge limit current by subtracting the calculated correction value γ from the previously set charge limit current, and may be configured to deliver the new charge limit current to the controller 200. Accordingly, the controller 200 may be configured to adjust the air supply amount and operate the converter to allow the changed charge limit current to be provided to the high-voltage battery 400. Through this process, an exemplary embodiment of the present invention may allow the high-voltage battery 400 to avoid being overcharged by reducing the amplitude of the charge limit current when the high-voltage battery 400 is in the overcharged state.

When the High-Voltage Battery 400 is Undercharged

In the foregoing step (s210), when the sensed charge current d is determined to be less than the charge limit current b, the battery management system 410 may be configured to compare a converter sensing current c, sensed in the converter 300, with the charge limit current b (step S300). In particular, in step S300, the battery management system 410 may be configured to determine whether a value, obtained by dividing the converter sensing current c, which is output from the converter 300 to the high-voltage battery 400 through a current sensor installed in the converter 300, by the set charge limit current b, is between a preset threshold value α and 1. This step S300 is for determining whether the converter 300 is driven to output a value close to (e.g., approximately) the charge limit current b, and when a value obtained by dividing the converter sensing current c by the set charge limit current b is between the preset threshold value α and 1, the converter 300 may be determined to be in operation, and thus a value about the same as the charge limit current b may be output.

Further, through step S300, when the converter 300 is determined to be in operation to output a value similar to the charge limit current b, the battery management system 410 may be configured to compare the magnitude of the sensed charge current d with the charge limit current b to determine whether the high-voltage battery 400 is in the undercharged state (step S310). In step S310, whether a value obtained by dividing the sensed charge current d by the charge limit current b is greater than a preset threshold value β may be determined. In step S310, when the value obtained by dividing the sensed charge current d by the charge limit current b is less than the preset threshold value β, an undercharged state may be detected, in which the sensed charge current d is significantly less than the charge limit current b.

In step S310, when the high-voltage battery 400 is determined to be undercharged, the battery management system 410 may be configured to accumulate the value of (d-b), obtained by subtracting the charge limit current b from the sensed charge current d (step S320). Particularly, the value of (d-b) becomes a negative number. In step S320, the battery management system 410 may be configured to count the number of times Time2 that the value of (d-b) is accumulated. The process for determining the magnitude of the value (d-b) and accumulating the same may be performed for each preset time interval, and the number of times Time2 that the process is performed may be counted. In subsequent steps, when the counted number of times is equal to or greater than a preset reference number of times ΔT2, the accumulated value of (d-b) may be averaged.

In other words, in step S330, the controller 200 may perform step S320 and may be configured to determine whether the number of times Time2 that the accumulation of (d-b) is performed is equal to or greater than a preset reference number of times. Then, as the result of the determination at step S330, when the number of times Time2 that the accumulation is performed is equal to or greater than a preset reference number of times, the controller 200 may be configured to calculate the correction value β by dividing the accumulated value of (d-b) by the total count value. Since the correction value may be obtained by accumulating the value of (d-b), which is a negative number, the correction value β is also a negative number.

In step S400, the charge limit current b may be updated by subtracting the correction value β from the preset charge limit current b. In other words, when the high-voltage battery 200 is in an overcharged state, at step S400, the battery management system 410 may be configured to calculate a new charge limit current, the magnitude of which is increased, by subtracting the calculated negative correction value β from a previously set charge limit current, and may be configured to deliver the new charge limit current to the controller 200. Accordingly, the controller 200 may be configured to adjust the air supply amount and operate the converter 300 to allow the changed charge limit current to be provided to the high-voltage battery 400.

Through these processes in an exemplary embodiment of the present invention, when the high-voltage battery 400 is in an undercharged state, the magnitude of the charge limit current may be increased to increase the charge current of the high-voltage battery 400 to a largest value allowed by the high-voltage battery 400. Furthermore, in an exemplary embodiment of the present invention as illustrated in FIG. 2, for the high-voltage battery protection and system operation stability (avoidance of a voltage fault), a reference count number T1 for overcharge protection correction may be determined to be significantly less than the count number T2 for inducing to correct the maximum charge of the high-voltage battery.

In addition, in the foregoing step S220, the number Time2 counted in step S320 and the accumulated value BB may be reset to 0, and in step S320, the number Time1 counted in step S220 and the accumulated value AA may be reset to 0. Accordingly, the application (d-b) to the charge limit current may be performed, when the state of charge of the high-voltage battery 400 is constantly maintained in an overcharged state or an undercharged state. When any one state is not maintained for the preset reference count number ΔT1 or ΔT2, the previously counted value and accumulated values may be reset to restart the count.

In the foregoing description, it has been described that processes for setting/updating the charge limit current of the high-voltage battery 400 may be performed in the battery management system 410 and that controller 200 may be configured to operate the converter 300 and adjust the valves of the fuel cell system. However, this is merely an example of a specific control method, and is not intended to restrict the control to be performed only for a specific element. In other words, the controller 200 and the battery management system 410 illustrated in FIG. 1 may share pieces of information, derived or input through mutual communication, and may be combined to be understood as being a single controller.

As described above, in a method for controlling the start of a fuel cell vehicle according to various exemplary embodiments of the present invention, during constant-voltage-driving of the fuel cell, the actual charge current to be provided to a high-voltage battery may be set as large as possible within a range that is less than a charge limit current. Thus, according to the method for controlling the start of a fuel cell vehicle, current output from the fuel cell may be maximally increased during cold start to thus induce maximum heating, and the start time of the fuel cell vehicle may be decreased according to the cold start. According to the method for controlling the start of a fuel cell vehicle of the present invention, the actual charge current provided to a high-voltage battery during constant-voltage-driving of a fuel cell vehicle may be set as high as possible within the range that is less than a charge-limited current.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for controlling a start of a fuel cell vehicle, comprising:
    providing, by a controller, hydrogen and air to a fuel cell;
    operating, by the controller, a converter to maintain a voltage of a high voltage bus to be constant, wherein the converter is disposed between a high-voltage battery and the high voltage bus to which an output stage of the fuel cell is connected, and the voltage of the high voltage bus becomes a preset lowest control voltage;
    setting, by the controller, a charge current of the high-voltage battery as a charge limit current;
    adjusting, by the controller, an air supply amount to the fuel cell and operating the converter to provide a current that corresponds to an amplitude of the charge limit current to the high-voltage battery; and
    changing, by the controller, the charge limit current based on a result of comparing a sensed charge current obtained by sensing a current input to the high-voltage battery, with the charge limit current.

2. The method of claim 1, wherein the setting the charge current is performed to set the charge limit current by dividing a chargeable output of the high-voltage battery by a voltage of the high-voltage battery.

3. The method of claim 1, further comprising:
    after changing the charge limit current, adjusting, by the controller, the air supply amount to the fuel cell and operating the converter to provide the changed charge limit current to the high-voltage battery.

4. The method of claim 1, wherein the changing the charge limit current is performed to add or subtract an error current between the sensed charge current and the charge limit current to or from the charge limit current to change the charge limit current.

5. The method of claim 4, wherein the changing the charge limit current is performed to add or subtract an average error current, which is obtained by detecting and accumulating the error current between the sensed charge current and the charge limit current for each preset time interval and by dividing the accumulated error current by a total number of times of detection, to or from the charge limit current to change the charge limit current.

6. The method of claim 1, wherein changing the charge limit current includes:
    comparing, by the controller, amplitudes of the sensed charge current and the charge limit current;
    accumulating, by the controller, a value, obtained by subtracting the charge limit current from the sensed charge current, for a preset number of first reference times, when the sensed charge current is greater than the charge limit current;
    deriving, by the controller, an average value by dividing the accumulated value of the subtraction by a number of first reference times; and
    updating, by the controller, the charge limit current with a value obtained by subtracting the average value from the charge limit current.

7. The method of claim 6, wherein changing the charge limit current further includes:
    comparing, by the controller, a converter sensing current sensed in the converter with the charge limit current, when the sensed charge current is less than the charge limit current;
    comparing, by the controller, the sensed charge current with the charge limit current to determine whether the high-voltage battery is undercharged, when a difference between the converter sensing current and the charge limit current is within a preset range;
    accumulating, by the controller, a value, obtained by subtracting the charge limit current from the sensed charge current, for a preset number of second reference times, when the high-voltage battery is determined to be undercharged;
    deriving, by the controller, an average value by dividing the accumulated value of the subtracted value by a number of second reference times; and
    updating, by the controller, the charge limit current with a value obtained by subtracting the average value from the charge limit current.

8. The method of claim 7, wherein the number of first reference times is less than the number of second reference times.

9. A system for controlling a start of a fuel cell vehicle, comprising:
    a memory configured to store program instructions; and
    a processor configured to execute the program instructions, the program instructions when executed configured to:
        provide hydrogen and air to a fuel cell;
        operate a converter to maintain a voltage of a high voltage bus to be constant,
    wherein the converter is disposed between a high-voltage battery and the high voltage bus to which an output stage of the fuel cell is connected, and the voltage of the high voltage bus becomes a preset lowest control voltage;
        set a charge current of the high-voltage battery as a charge limit current;
        adjust an air supply amount to the fuel cell and operate the converter to provide a current that corresponds to an amplitude of the charge limit current to the high-voltage battery; and
        charge the charge limit current based on a result of comparing a sensed charge current obtained by sensing a current input to the high-voltage battery, with the charge limit current.

10. The system of claim 9, wherein the setting the charge current is performed to set the charge limit current by dividing a chargeable output of the high-voltage battery by a voltage of the high-voltage battery.

11. The system of claim 9, wherein the program instructions when executed are further configured to:

after changing the charge limit current adjust the air supply amount to the fuel cell and operate the converter to provide the changed charge limit current to the high-voltage battery.

12. The system of claim 9, wherein the changing the charge limit current is performed to add or subtract an error current between the sensed charge current and the charge limit current to or from the charge limit current to change the charge limit current.

13. The system of claim 12, wherein the changing the charge limit current is performed to add or subtract an average error current, which is obtained by detecting and accumulating the error current between the sensed charge current and the charge limit current for each preset time interval and by dividing the accumulated error current by a total number of times of detection, to or from the charge limit current to change the charge limit current.

14. The system of claim 9, wherein the program instructions for changing the charge limit current when executed are further configured to:
   compare amplitudes of the sensed charge current and the charge limit current;
   accumulate a value, obtained by subtracting the charge limit current from the sensed charge current, for a preset number of first reference times, when the sensed charge current is greater than the charge limit current;
   derive an average value by dividing the accumulated value of the subtraction by a number of first reference times; and
   update the charge limit current with a value obtained by subtracting the average value from the charge limit current.

15. The system of claim 9, wherein the program instructions for changing the charge limit current when executed are further configured to:
   compare a converter sensing current sensed in the converter with the charge limit current, when the sensed charge current is less than the charge limit current;
   compare the sensed charge current with the charge limit current to determine whether the high-voltage battery is undercharged, when a difference between the converter sensing current and the charge limit current is within a preset range;
   accumulate a value, obtained by subtracting the charge limit current from the sensed charge current, for a preset number of second reference times, when the high-voltage battery is determined to be undercharged;
   derive an average value by dividing the accumulated value of the subtracted value by a number of second reference times; and
   update the charge limit current with a value obtained by subtracting the average value from the charge limit current.

16. The system of claim 15, wherein the number of first reference times is less than the number of second reference times.

* * * * *